(12) United States Patent
Koshigaya et al.

(10) Patent No.: US 12,131,086 B2
(45) Date of Patent: Oct. 29, 2024

(54) IMAGE FORMING APPARATUS THAT PRODUCES PRINT FOR DELIVERY, METHOD OF CONTROLLING IMAGE FORMING APPARATUS, AND STORAGE MEDIUM

(71) Applicant: CANON KABUSHIKI KAISHA, Tokyo (JP)

(72) Inventors: Motoki Koshigaya, Saitama (JP); Manabu Hada, Tokyo (JP); Tsutomu Kubota, Chiba (JP); Tatsuya Ogawa, Ibaraki (JP); Hidetaka Tabuchi, Chiba (JP); Tsunahito Nakashita, Chiba (JP); Akitomo Fukui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/326,193

(22) Filed: May 31, 2023

(65) Prior Publication Data
US 2023/0393792 A1    Dec. 7, 2023

(30) Foreign Application Priority Data

Jun. 6, 2022   (JP) ................................ 2022-091471

(51) Int. Cl.
*G06F 3/12* (2006.01)
(52) U.S. Cl.
CPC .......... *G06F 3/1263* (2013.01); *G06F 3/1211* (2013.01)
(58) Field of Classification Search
CPC ...... G06F 3/1263; G06F 3/1211; G06F 3/126; G06F 3/1237
See application file for complete search history.

(56) References Cited

U.S. PATENT DOCUMENTS

2010/0271647 A1\* 10/2010 Tokura ............... H04N 1/00628
358/1.12
2011/0038002 A1\* 2/2011 Nakamura ............... G06F 3/121
358/1.15
(Continued)

FOREIGN PATENT DOCUMENTS

JP    2016175757 A    10/2016
JP    2016179674 A    10/2016

OTHER PUBLICATIONS

JP 2016179674 A English translation. (Year: 2016).\*

*Primary Examiner* — Iriana Cruz
(74) *Attorney, Agent, or Firm* — ROSSI, KIMMS & McDOWELL LLP

(57) ABSTRACT

An image forming apparatus includes an operation unit for receiving an instruction given by a user, and according to receipt of a request of a print-and-delivery job from an external apparatus, performs print processing to produce a print and passes the produced print to a print delivery apparatus that delivers a print to a designated delivery destination. A controller controls an order of execution of jobs. In a state in which a print-and-delivery job has been registered in a job queue of the image forming apparatus, in a case where an instruction for executing a predetermined job which cannot be processed in parallel with the print-and-delivery job is received from the operation unit, the controller performs predetermined job priority control for causing the predetermined job to be preferentially executed.

8 Claims, 30 Drawing Sheets

(56) References Cited

U.S. PATENT DOCUMENTS

| | | | |
|---|---|---|---|
| 2012/0236351 A1* | 9/2012 | Arima | G06K 15/1809 358/1.15 |
| 2013/0286430 A1* | 10/2013 | Morris | G06F 3/1217 358/1.15 |
| 2019/0079714 A1* | 3/2019 | Kawanishi | G03G 15/553 |
| 2022/0137892 A1* | 5/2022 | Usami | G06F 3/1263 358/1.13 |
| 2022/0191264 A1* | 6/2022 | Cain | H04L 65/61 |
| 2022/0229610 A1* | 7/2022 | Ota | G06F 3/1282 |

* cited by examiner

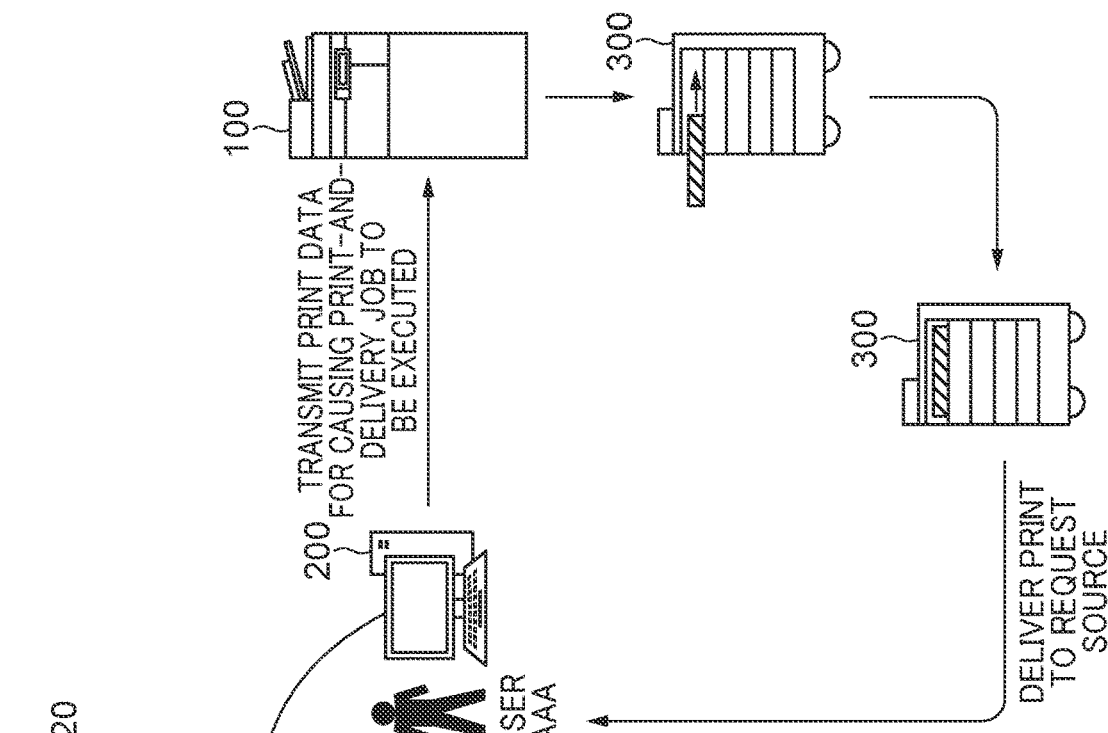
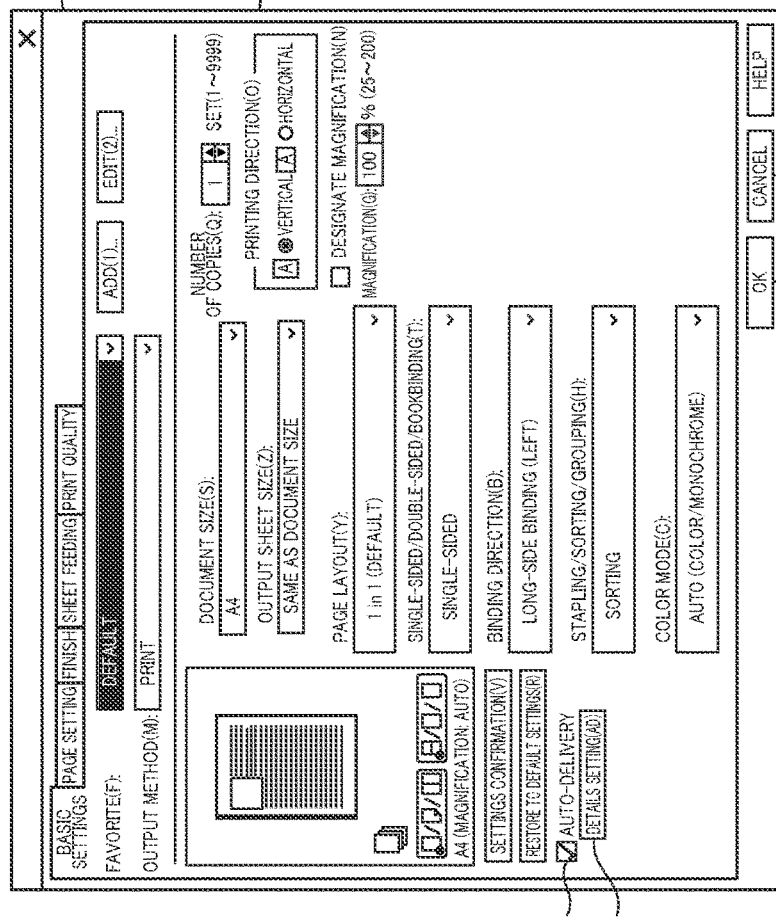
FIG. 7A

FIG. 7B

| No. | TRANSMISSION TIME | SCHEDULED DELIVERY TIME | MFP STATUS | DELIVERY STATUS |
|---|---|---|---|---|
| 1 | 14:49 | 15:08 | PRINTING | COLLECTING |
| 2 | 14:49 | 15:08 | WAITING | COLLECTING |
| 3 | | | | |
| 4 | | | | |

230

FIG. 9A1
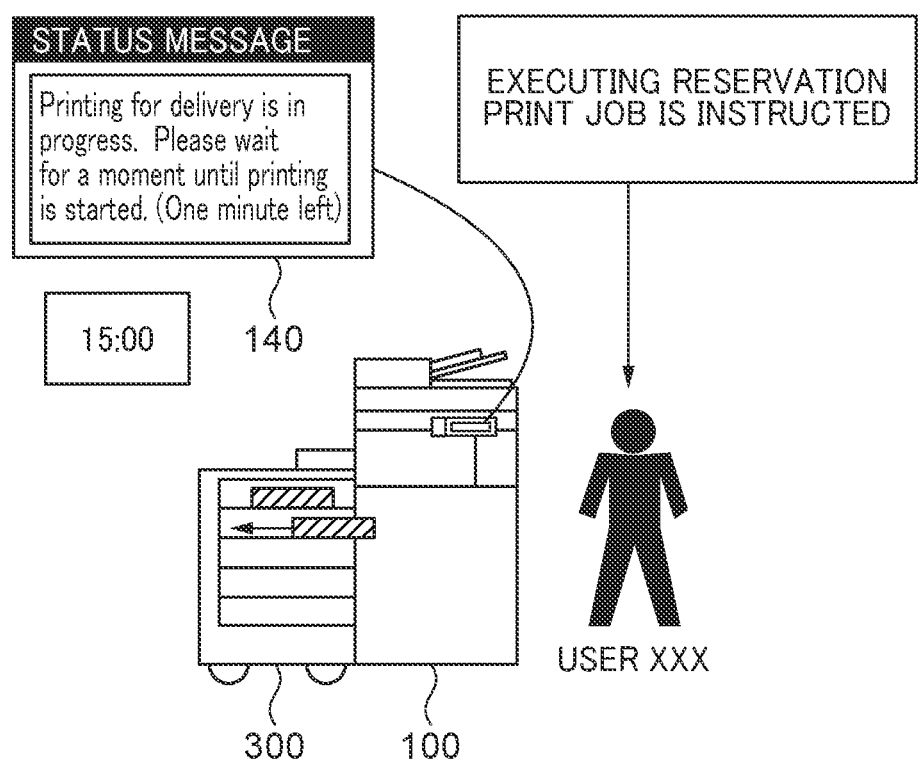

*FIG. 9A2*

| No. | RECEPTION TIME | START TIME | JOB NAME | USER NAME | STATUS | WAITING TIME |
|---|---|---|---|---|---|---|
| 1 | 14:58 | 14:59 | DELIVERY PRINT | BBB | AWAITING DELIVERY | – |
| 2 | 14:59 | 15:00 | DELIVERY PRINT | AAA | PRINTING | WITHIN 0 MINUTES |
| 3 | 14:59 | 15:01 | DELIVERY PRINT | AAA | WAITING | WITHIN 1 MINUTE |
| 4 | 15:00 | 15:02 | START OF ROBOT | DELIVERY ROBOT | WAITING | WITHIN 2 MINUTES |
| 5 | 15:00 | 15:08 | ARRIVAL OF ROBOT | DELIVERY ROBOT | WAITING | WITHIN 8 MINUTES |
| 6 | 15:00 | 15:09 | DELIVERY PRINT | CCC | WAITING | WITHIN 9 MINUTES |
| 7 | | | | | | |
| 8 | | | | | | |

130

FIG. 9B1
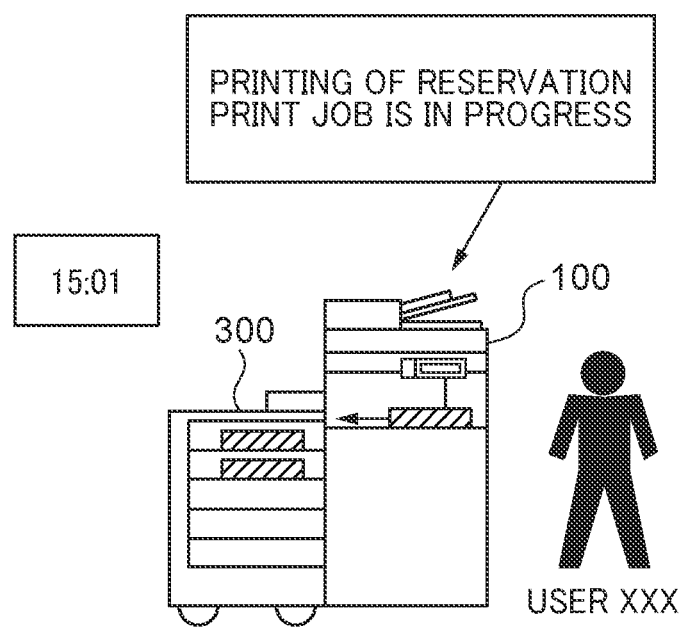

FIG. 9B2

| No. | RECEPTION TIME | START TIME | JOB NAME | USER NAME | STATUS | WAITING TIME |
|---|---|---|---|---|---|---|
| 1 | 14:58 | 14:59 | DELIVERY PRINT | BBB | AWAITING DELIVERY | – |
| 2 | 14:59 | 15:00 | DELIVERY PRINT | AAA | AWAITING DELIVERY | – |
| 3 | 15:00 | 15:01 | PRINT | XXX | PRINTING | WITHIN 6 MINUTES |
| 4 | 14:59 | 15:08 | DELIVERY PRINT | AAA | WAITING | WITHIN 7 MINUTE |
| 5 | 15:00 | 15:09 | START OF ROBOT | DELIVERY ROBOT | WAITING | WITHIN 8 MINUTES |
| 6 | 15:00 | 15:15 | ARRIVAL OF ROBOT | DELIVERY ROBOT | WAITING | WITHIN 14 MINUTES |
| 7 | 15:00 | 15:16 | DELIVERY PRINT | CCC | WAITING | WITHIN 15 MINUTES |
| 8 | | | | | | |

FIG. 9C1
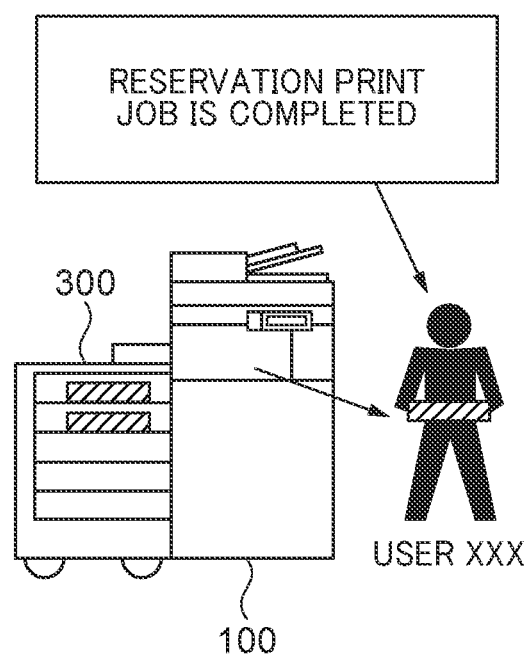

FIG. 9C2

| No. | RECEPTION TIME | START TIME | JOB NAME | USER NAME | STATUS | WAITING TIME |
|---|---|---|---|---|---|---|
| 1 | 14:58 | 14:59 | DELIVERY PRINT | BBB | AWAITING DELIVERY | – |
| 2 | 14:59 | 15:00 | DELIVERY PRINT | AAA | AWAITING DELIVERY | – |
| 3 | 15:00 | 15:01 | PRINT | XXX | COMPLETED | – |
| 4 | 14:59 | 15:08 | DELIVERY PRINT | AAA | WAITING | WITHIN 1 MINUTE |
| 5 | 15:00 | 15:09 | START OF ROBOT | DELIVERY ROBOT | WAITING | WITHIN 2 MINUTES |
| 6 | 15:00 | 15:15 | ARRIVAL OF ROBOT | DELIVERY ROBOT | WAITING | WITHIN 8 MINUTES |
| 7 | 15:00 | 15:16 | DELIVERY PRINT | CCC | WAITING | WITHIN 9 MINUTES |
| 8 | | | | | | |

132

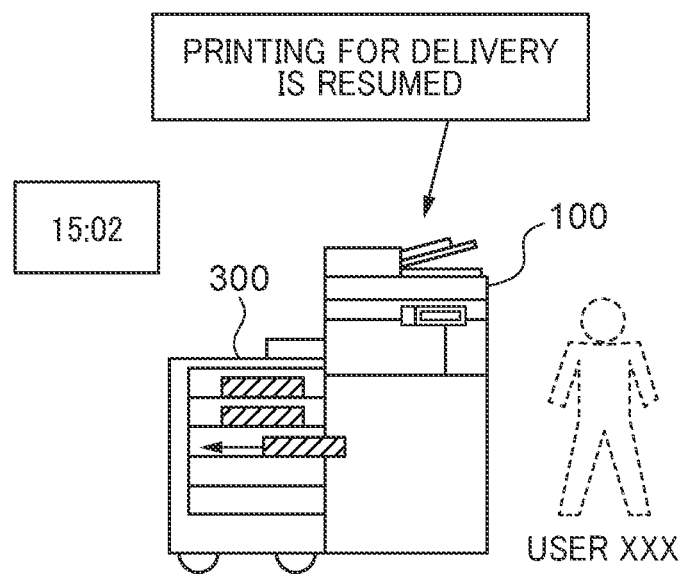
FIG. 9D1

*FIG. 9D2*

| No. | RECEPTION TIME | START TIME | JOB NAME | USER NAME | STATUS | WAITING TIME |
|---|---|---|---|---|---|---|
| 1 | 14:58 | 14:59 | DELIVERY PRINT | BBB | AWAITING DELIVERY | — |
| 2 | 14:59 | 15:00 | DELIVERY PRINT | AAA | AWAITING DELIVERY | — |
| 3 | 14:59 | 15:08 | DELIVERY PRINT | AAA | PRINTING | WITHIN 0 MINUTES |
| 4 | 15:00 | 15:09 | START OF ROBOT | DELIVERY ROBOT | WAITING | WITHIN 1 MINUTE |
| 5 | 15:00 | 15:15 | ARRIVAL OF ROBOT | DELIVERY ROBOT | WAITING | WITHIN 7 MINUTES |
| 6 | 15:00 | 15:16 | DELIVERY PRINT | CCC | PRINTING | WITHIN 8 MINUTES |
| 7 | 15:02 | 15:17 | START OF ROBOT | DELIVERY ROBOT | WAITING | WITHIN 9 MINUTES |
| 8 | 15:02 | 15:21 | ARRIVAL OF ROBOT | DELIVERY ROBOT | WAITING | WITHIN 13 MINUTES |

133

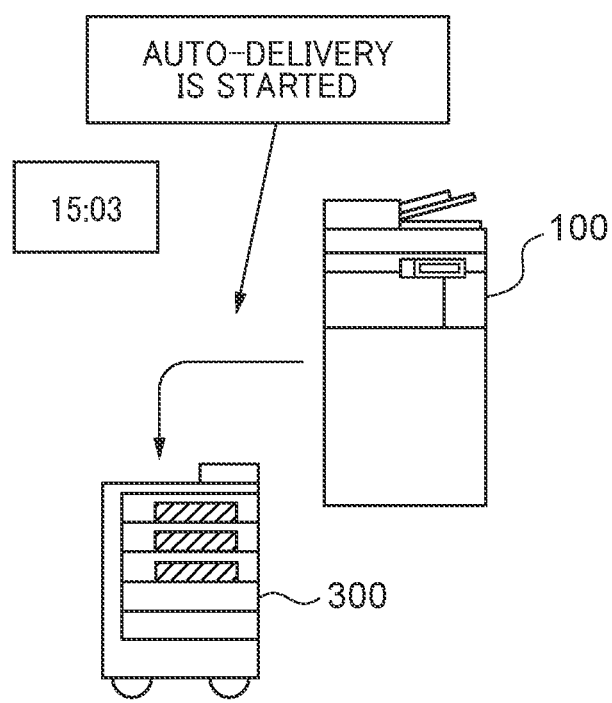
FIG. 9E1

*FIG. 9E2*

| No. | RECEPTION TIME | START TIME | JOB NAME | USER NAME | STATUS | WAITING TIME |
|---|---|---|---|---|---|---|
| 1 | 15:00 | 15:09 | START OF ROBOT | DELIVERY ROBOT | DELIVERING | – |
| 2 | 15:00 | 15:15 | ARRIVAL OF ROBOT | DELIVERY ROBOT | WAITING | WITHIN 6 MINUTES |
| 3 | 15:00 | 15:16 | DELIVERY PRINT | CCC | PRINTING | WITHIN 7 MINUTES |
| 4 | 15:02 | 15:17 | START OF ROBOT | DELIVERY ROBOT | WAITING | WITHIN 8 MINUTES |
| 5 | 15:02 | 15:21 | ARRIVAL OF ROBOT | DELIVERY ROBOT | WAITING | WITHIN 12 MINUTES |
| 6 | | | | | | |
| 7 | | | | | | |
| 8 | | | | | | |

FIG. 10B

| No. | RECEPTION TIME | START TIME | JOB NAME | USER NAME | STATUS | WAITING TIME |
|---|---|---|---|---|---|---|
| 1 | 14:58 | 14:59 | DELIVERY PRINT | BBB | AWAITING DELIVERY | — |
| 2 | 14:59 | 15:00 | DELIVERY PRINT | AAA | AWAITING DELIVERY | — |
| 3 | 15:00 | 15:01 | PRINT | XXX | PRINTING | WITHIN 6 MINUTES |
| 4 | 14:59 | 15:08 | DELIVERY PRINT | AAA | WAITING | WITHIN 7 MINUTES |
| 5 | 15:00 | 15:09 | START OF ROBOT | DELIVERY ROBOT | WAITING | WITHIN 8 MINUTES |
| 6 | 15:00 | 15:15 | ARRIVAL OF ROBOT | DELIVERY ROBOT | WAITING | WITHIN 14 MINUTES |
| 7 | 15:00 | 15:16 | DELIVERY PRINT | CCC | PRINTING | WITHIN 15 MINUTES |
| 8 | | | | | | |

140

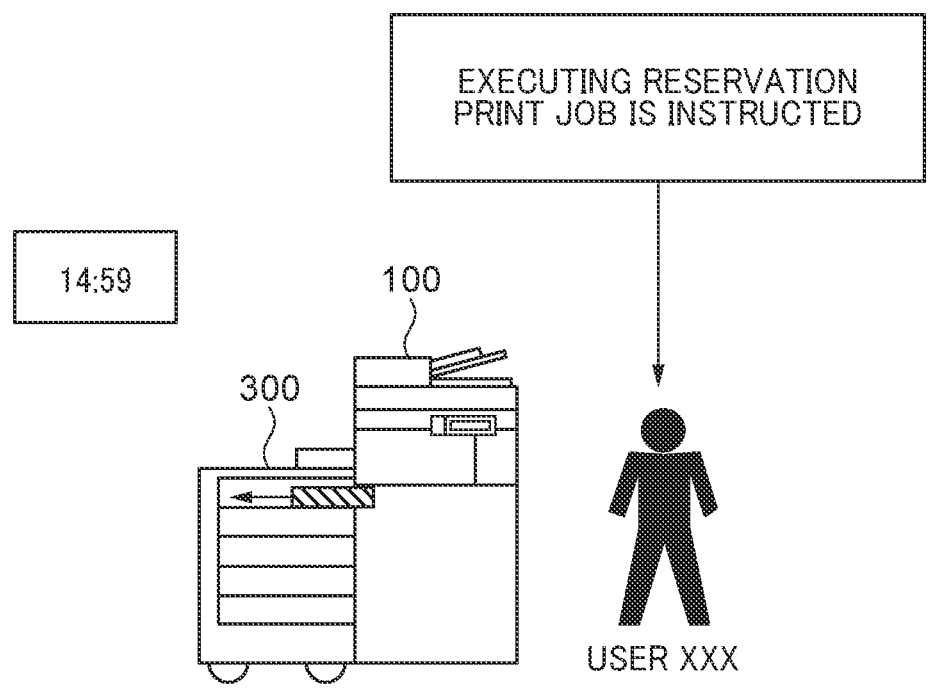
FIG. 14A1

FIG. 14A2

| No. | RECEPTION TIME | START TIME | JOB NAME | USER NAME | STATUS | WAITING TIME | DESIRED DELIVERY TIME | PRIORITY |
|---|---|---|---|---|---|---|---|---|
| 1 | 14:58 | 14:59 | DELIVERY PRINT | BBB | PRINTING | – | – | – |
| 2 | 14:59 | 15:00 | DELIVERY PRINT | AAA | WAITING | WITHIN 0 MINUTES | 15:15 | NORMAL |
| 3 | 14:59 | 15:01 | DELIVERY PRINT | AAA | WAITING | WITHIN 1 MINUTE | 15:05 | DESIRED |
| 4 | 15:00 | 15:02 | START OF ROBOT | DELIVERY ROBOT | WAITING | WITHIN 2 MINUTES | – | – |
| 5 | 15:00 | 15:08 | ARRIVAL OF ROBOT | DELIVERY ROBOT | WAITING | WITHIN 4 MINUTES | – | – |
| 6 | | | | | | | | |
| 7 | | | | | | | | |
| 8 | | | | | | | | |

150

FIG. 14B1
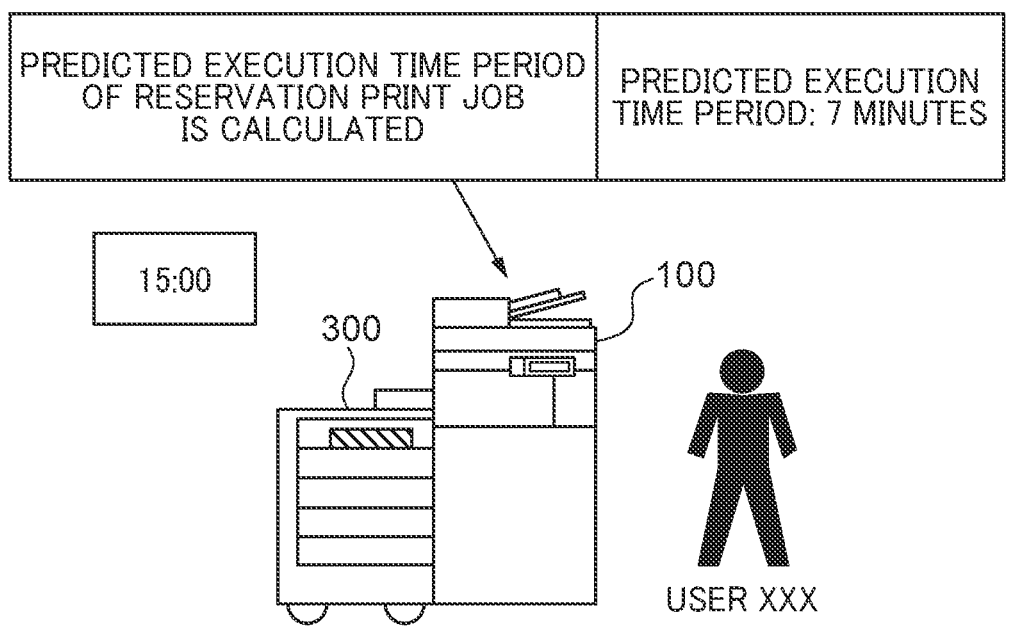

| No. | RECEPTION TIME | START TIME | JOB NAME | USER NAME | STATUS | WAITING TIME | DESIRED DELIVERY TIME | PRIORITY |
|---|---|---|---|---|---|---|---|---|
| 1 | 14:58 | 14:59 | DELIVERY PRINT | BBB | AWAITING DELIVERY | – | – | – |
| 2 | 14:59 | 15:00 | DELIVERY PRINT | AAA | WAITING | – | 15:15 | NORMAL |
| 3 | 14:59 | 15:02 | DELIVERY PRINT | AAA | WAITING | WITHIN 1 MINUTE | 15:05 | DESIRED |
| 4 | 15:00 | 15:03 | START OF ROBOT | DELIVERY ROBOT | WAITING | WITHIN 2 MINUTES | – | – |
| 5 | 15:00 | 15:09 | ARRIVAL OF ROBOT | DELIVERY ROBOT | WAITING | WITHIN 4 MINUTES | – | – |
| 6 |  |  |  |  |  |  |  |  |
| 7 |  |  |  |  |  |  |  |  |
| 8 |  |  |  |  |  |  |  |  |

FIG. 14C1
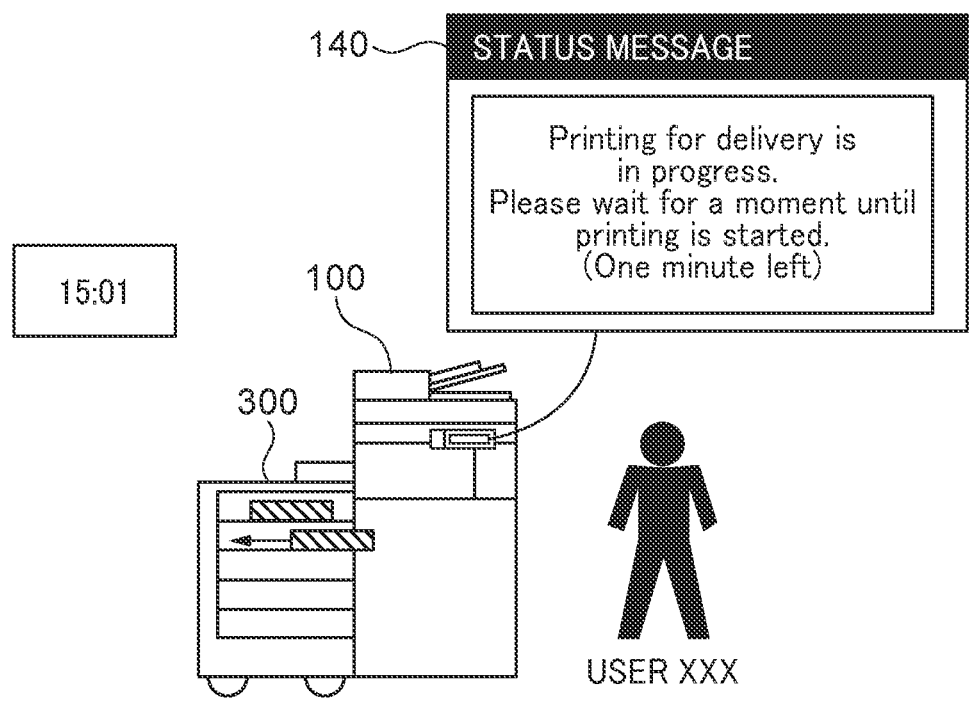

FIG. 14C2

| No. | RECEPTION TIME | START TIME | JOB NAME | USER NAME | STATUS | WAITING TIME | DESIRED DELIVERY TIME | PRIORITY |
|---|---|---|---|---|---|---|---|---|
| 1 | 14:58 | 14:59 | DELIVERY PRINT | BBB | AWAITING DELIVERY | — | — | — |
| 2 | 14:59 | 15:01 | DELIVERY PRINT | AAA | PRINTING | WITHIN 0 MINUTES | 15:05 | DESIRED |
| 3 | 15:00 | 15:02 | START OF ROBOT | DELIVERY ROBOT | WAITING | WITHIN 1 MINUTE | — | — |
| 4 | 15:00 | 15:03 | PRINT | XXX | WAITING | WITHIN 8 MINUTES | — | — |
| 5 | 15:00 | 15:10 | ARRIVAL OF ROBOT | DELIVERY ROBOT | WAITING | WITHIN 10 MINUTES | — | — |
| 6 | 14:49 | 15:11 | DELIVERY PRINT | AAA | WAITING | WITHIN 11 MINUTES | 15:15 | NORMAL |
| 7 | 15:02 | 15:12 | START OF ROBOT | DELIVERY ROBOT | WAITING | WITHIN 12 MINUTES | — | — |
| 8 | 15:02 | 15:15 | ARRIVAL OF ROBOT | DELIVERY ROBOT | WAITING | WITHIN 15 MINUTES | — | — |

IMAGE FORMING APPARATUS THAT PRODUCES PRINT FOR DELIVERY, METHOD OF CONTROLLING IMAGE FORMING APPARATUS, AND STORAGE MEDIUM

BACKGROUND OF THE INVENTION

Field of the Invention

The present invention relates to an image forming apparatus, a method of controlling the image forming apparatus, and a storage medium.

Description of the Related Art

There is known an image forming apparatus that produces a print by performing print processing according to a print instruction given by a user. The user can give a print instruction to the image forming apparatus from a computer. In a case where the user gives a print instruction to the image forming apparatus from the computer, the user is required to go to the image forming apparatus to get a print after giving the print instruction, which takes time and effort. To reduce the time and effort of the user, there has been developed a print delivery apparatus that delivers a print. The print delivery apparatus receives a print produced by the image forming apparatus from the image forming apparatus and delivers the received print to a destination, such as the desk of a user who has given the print instruction (see e.g. Japanese Laid-Open Patent Publication (Kokai) No. 2016-179674).

Further, there has been also developed a print delivery apparatus including a plurality of print storage sections (see e.g. Japanese Laid-Open Patent Publication (Kokai) No. 2016-175757). It has been studied to collectively process a plurality of print-and-delivery jobs requested within a predetermined time period by using such a print delivery apparatus. For example, the image forming apparatus produces all prints of a plurality of print-and-delivery jobs requested within the predetermined time period and passes all of the produced prints to the print delivery apparatus, and the print delivery apparatus stores the prints in the print storage sections that vary with each request source and delivers each print to an associated request source. This makes it possible to improve the print delivery efficiency.

However, if a plurality of print-and-delivery jobs requested within the predetermined time period are collectively processed, the image forming apparatus cannot execute another job which cannot be executed in parallel with any print-and-delivery job until production and delivery of all prints of the plurality of print-and-delivery jobs is completed. This causes a problem that a user who has given an instruction for executing the other job which cannot be executed in parallel with any print-and-delivery job from an operation section of the image forming apparatus is compelled to wait longer than necessary.

SUMMARY OF THE INVENTION

The present invention provides an image forming apparatus that is capable of reducing a waiting time of a user who has given an instruction for executing a predetermined job from an operation section, a method of controlling the image forming apparatus, and a storage medium.

In a first aspect of the present invention, there is provided an image forming apparatus that includes an operation unit configured to receive an instruction given by a user, and according to receipt of a request of a print-and-delivery job from an external apparatus, performs print processing to produce a print and passes the produced print to a print delivery apparatus that delivers a print to a designated delivery destination, including at least one processor, and a memory coupled to the at least one processor, the memory having instructions that, when executed by the processor, perform the operations as: a control unit configured to control an order of execution of jobs, wherein in a state in which a print-and-delivery job has been registered in a job queue of the image forming apparatus, in a case where an instruction for executing a predetermined job which cannot be processed in parallel with the print-and-delivery job is received from the operation unit, the control unit performs predetermined job priority control for causing the predetermined job to be preferentially executed.

In a second aspect of the present invention, there is provided a method of controlling an image forming apparatus that includes an operation unit configured to receive an instruction given by a user, and according to receipt of a request of a print-and-delivery job from an external apparatus, performs print processing to produce a print and passes the produced print to a print delivery apparatus that delivers a print to a designated delivery destination, including controlling an order of execution of jobs, said controlling including, in a state in which a print-and-delivery job has been registered in a job queue of the image forming apparatus, in a case where an instruction for executing a predetermined job which cannot be processed in parallel with the print-and-delivery job is received from the operation unit, performing predetermined job priority control for causing the predetermined job to be preferentially executed.

According to the present invention, it is possible to reduce a waiting time of a user who has given an instruction for executing a predetermined job to an image forming apparatus from an operation section thereof.

Further features of the present invention will become apparent from the following description of exemplary embodiments (with reference to the attached drawings).

BRIEF DESCRIPTION OF THE DRAWINGS

FIGS. 7A and 7B are diagrams useful in explaining a print-and-delivery job request performed by the PC appearing in FIG. 1.

FIGS. 9A1 to 9E2 are diagrams useful in explaining operations performed by the image forming apparatus when the image forming apparatus having a job queue in which print-and-delivery jobs have been registered receives an instruction for executing a predetermined job from an operation panel thereof.

FIGS. 10A and 10B are diagrams useful in explaining an operation performed by the image forming apparatus in a case where a predicted execution time period of a reservation print job is equal to or longer than a reference time period.

FIGS. 14A1 to 14C2 are diagrams useful in explaining steps in FIG. 13.

DESCRIPTION OF THE EMBODIMENTS

The present invention will now be described in detail below with reference to the accompanying drawings showing embodiments thereof. However, the components of the following embodiments are described only by way of example, and are by no means intended to limit the scope of the present invention to them alone.

Figure 1:
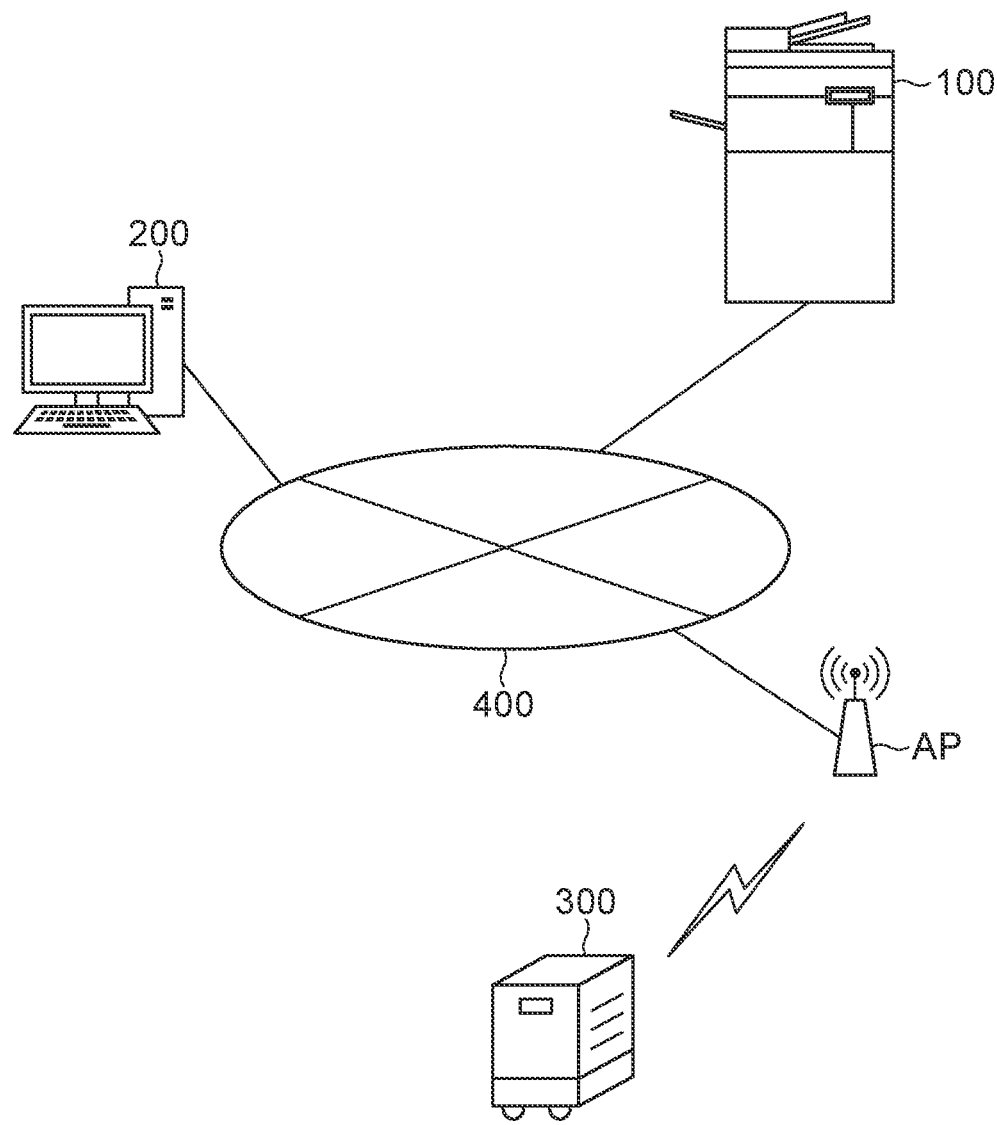
FIG. 1 is a diagram showing an example of a network configuration of an image forming apparatus according to the present embodiment.

FIG. 1 is a diagram showing an example of network configuration of an image forming apparatus 100 according to the present embodiment. Referring to FIG. 1, the image forming apparatus 100 is connected to a network 400. To the network 400, a personal computer (PC) 200 is also connected. The image forming apparatus 100 is capable of communicating with the PC 200 via the network 400. Note that although FIG. 1 shows the configuration in which one PC 200 is connected to the network 400 by way of example, it is assumed that in the present embodiment, the use of the image forming apparatus 100 in an office is assumed, and hence a plurality of PCs may be connected to the network 400. To the network 400, an access point AP is further connected. The image forming apparatus 100 is capable of communicating with a device connected to a wireless LAN, via the access point AP. For example, the image forming apparatus 100 can communicate with a print delivery apparatus 300 having a wireless LAN function.

Next, the configuration of the image forming apparatus 100 will be described. The image forming apparatus 100 is a multifunction peripheral (MFP) equipped with a plurality of functions, such as a print function, a scanner function, a copy function, and a FAX function. The image forming apparatus 100 produces a print by performing print processing according to an instruction received from the PC 200 and passes the produced print to the print delivery apparatus 300. Further, the image forming apparatus 100 transmits e.g. information on a delivery destination of a print and authentication information for use when receiving the print, to the print delivery apparatus 300.

Figure 2:
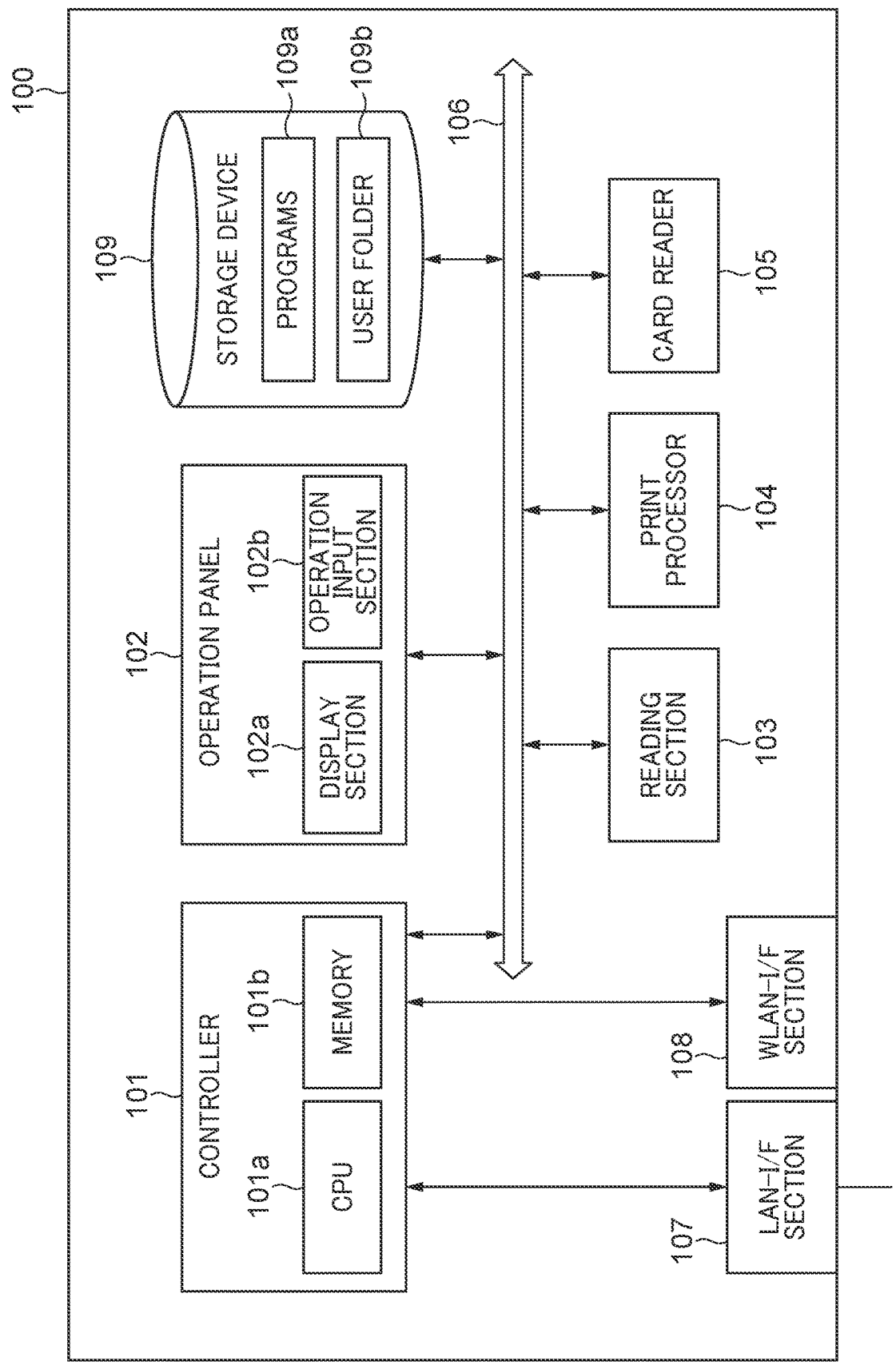
FIG. 2 is a schematic block diagram showing a hardware configuration of the image forming apparatus appearing in FIG. 1.
Figure 3:
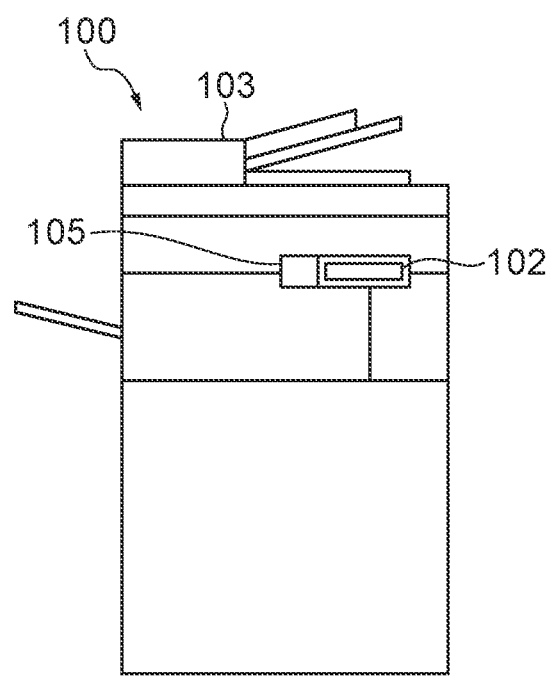
FIG. 3 is an appearance view of the image forming apparatus appearing in FIG. 1.

FIG. 2 is a schematic block diagram showing a hardware configuration of the image forming apparatus 100 appearing in FIG. 1. FIG. 3 is an appearance view of the image forming apparatus 100.

Referring to FIG. 2, the image forming apparatus 100 includes a controller 101, an operation panel 102, a reading section 103, a print processor 104, a card reader 105, a LAN-interface (I/F) section 107, a WLAN-interface section 108, and a storage device 109. The controller 101, the operation panel 102, the reading section 103, the print processor 104, the card reader 105, and the storage device 109 are interconnected via a bus 106.

The controller 101 controls the operation of the image forming apparatus 100. The controller 101 includes a CPU 101a and a memory 101b. The CPU 101a loads any of programs 109a stored in the storage device 109 into the memory 101b and executes the loaded program 109a. The memory 101b temporarily stores e.g. intermediate data generated by the CPU 101a executing the program 109a.

The operation panel 102 is a user interface and receives an operation instruction input by a user. The operation panel 102 is implemented by e.g. a liquid crystal panel. The operation panel 102 includes a display section 102a that displays a variety of information and an operation input section 102b that receives an operation instruction input by a user by detecting an operation performed by the user on the display section 102a.

The reading section 103 reads an image of a document to generate image data. The print processor 104 performs print processing based on the image data generated by the reading section 103 to produce a print. The card reader 105 reads a card for performing personal authentication of a user. The LAN-interface section 107 is an interface for connecting to a wired network to communicate with an external apparatus. The WLAN-interface section 108 is an interface for connecting to a wireless network to communicate with an external apparatus. The storage device 109 stores the programs 109a, image data, setting information, and so forth. Further, the storage device 109 includes a user folder 109b for storing print data used for print processing.

Next, the configuration of the print delivery apparatus 300 will be described. The print delivery apparatus 300 receives a print from the image forming apparatus 100, stores the received print in a collection section 306, described hereinafter, and delivers the print to a delivery destination designated from the image forming apparatus 100.

Figure 4:
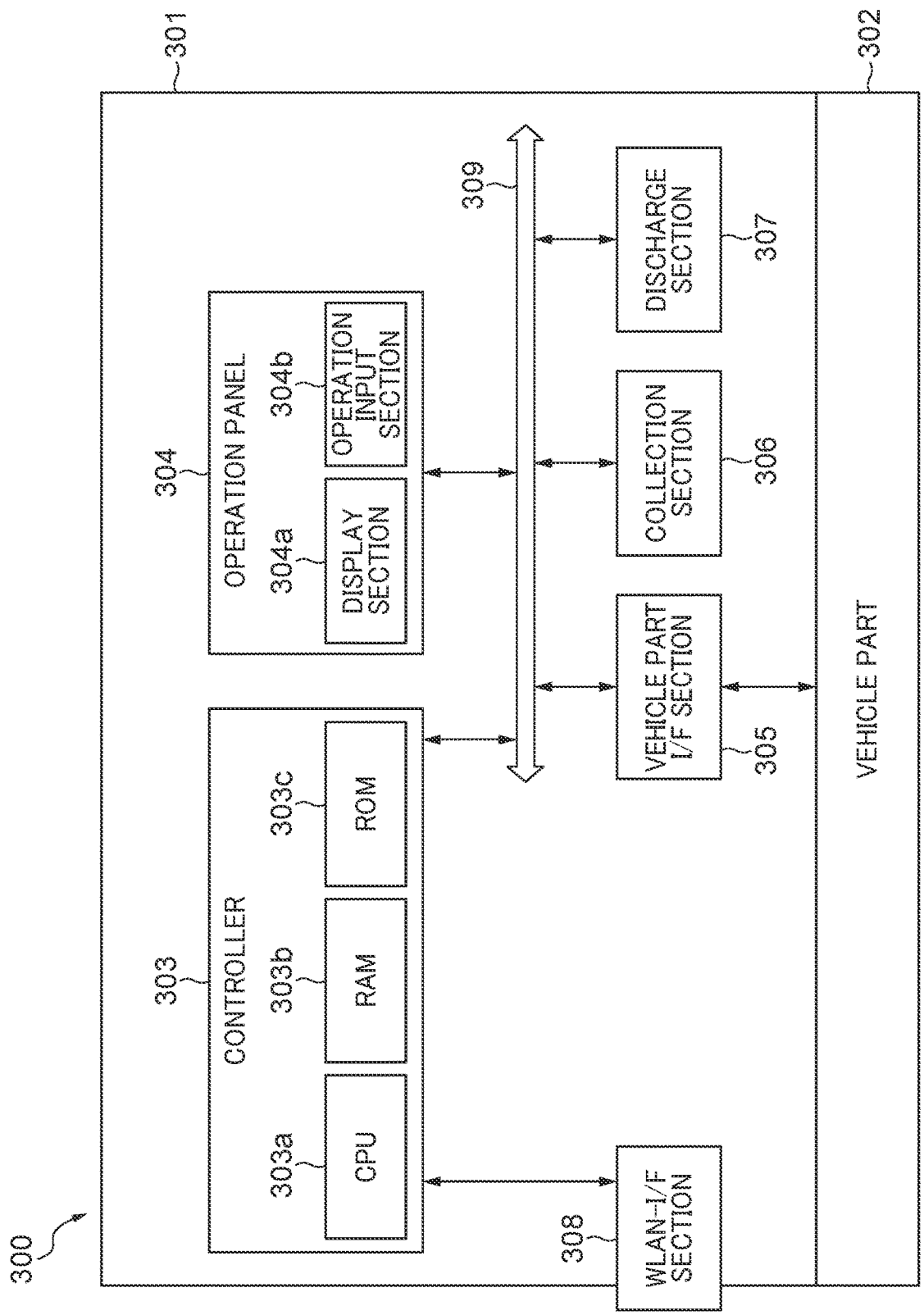
FIG. 4 is a schematic block diagram showing a hardware configuration of a print delivery apparatus appearing in FIG. 1.
Figure 5:
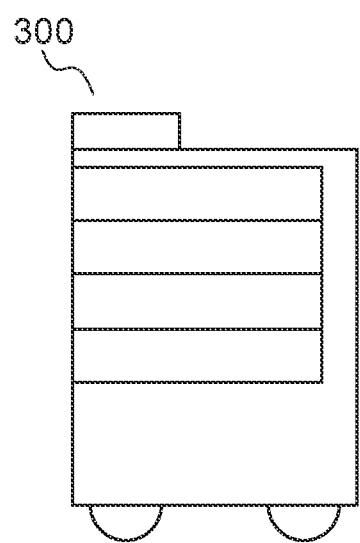
FIG. 5 is an appearance view of the print delivery apparatus.

FIG. 4 is a schematic block diagram showing a hardware configuration of the print delivery apparatus 300 appearing in FIG. 1. FIG. 5 is an appearance view of the print delivery apparatus 300.

Referring to FIG. 4, the print delivery apparatus 300 is comprised of a delivery apparatus controller 301 that controls the operation of the print delivery apparatus 300 and a vehicle part 302 for moving to a designated place based on map information stored in advance.

The delivery apparatus controller 301 includes a controller 303, an operation panel 304, a vehicle part interface section 305, the collection section 306, and a discharge section 307. These components are interconnected via a bus 309. Further, the delivery apparatus controller 301 includes a WLAN-interface section 308 for connecting to a wireless network to communicate with an external apparatus.

The controller 303 controls the operation of the delivery apparatus controller 301. The controller 303 includes a CPU 303a, a RAM 303b, and a ROM 303c. The CPU 303a loads a program stored in the ROM 303c into the RAM 303b and executes the loaded program. The RAM 303b temporarily stores intermediate data generated by the CPU 303a executing the program, and the like. The ROM 303c stores operation programs and the like of the delivery apparatus controller 301.

The operation panel 304 is a user interface and receives an operation instruction input by a user. The operation panel 304 is implemented by e.g. a liquid crystal panel. The operation panel 304 includes a display section 304a that displays a variety of information and an operation input section 304b that receives an operation instruction from a user by detecting an operation performed by the user on the display section 304a. The vehicle part interface section 305 is an interface used by the delivery apparatus controller 301 to communicate with the vehicle part 302. The collection section 306 stores prints received from the image forming apparatus 100. The discharge section 307 discharges the prints stored in the collection section 306 to the outside. Note that in the present embodiment, the collection section 306 and the discharge section 307 are each provided in plurality so as to make it possible to manage prints of a plurality of print-and-delivery jobs requested within a predetermined time period, on a request source-by-request source basis. The collection section 306 and the discharge section 307 may be mechanically unified. Alternatively, the collection section 306 and the discharge section 307 may be components independent of each other, and may include an arm (not shown) for collecting or discharging each print. Further, the collection section 306 and the discharge section 307 may each include a sensor (not shown) for detecting presence/absence of a print.

Assuming that the print delivery apparatus 300 is configured, for example, to include the above-mentioned arm, when discharging of a print is completed by this arm, it is determined that delivery (supply) of the print is completed. Alternatively, assuming that the print delivery apparatus 300 is configured not to include the above-mentioned arm, the collection section 306 and the discharge section 307 each have a tray shape or a box shape, and when it is detected by the above-mentioned sensor that a print is removed from an associated one of them, it is determined that delivery of the print is completed.

Figure 6:
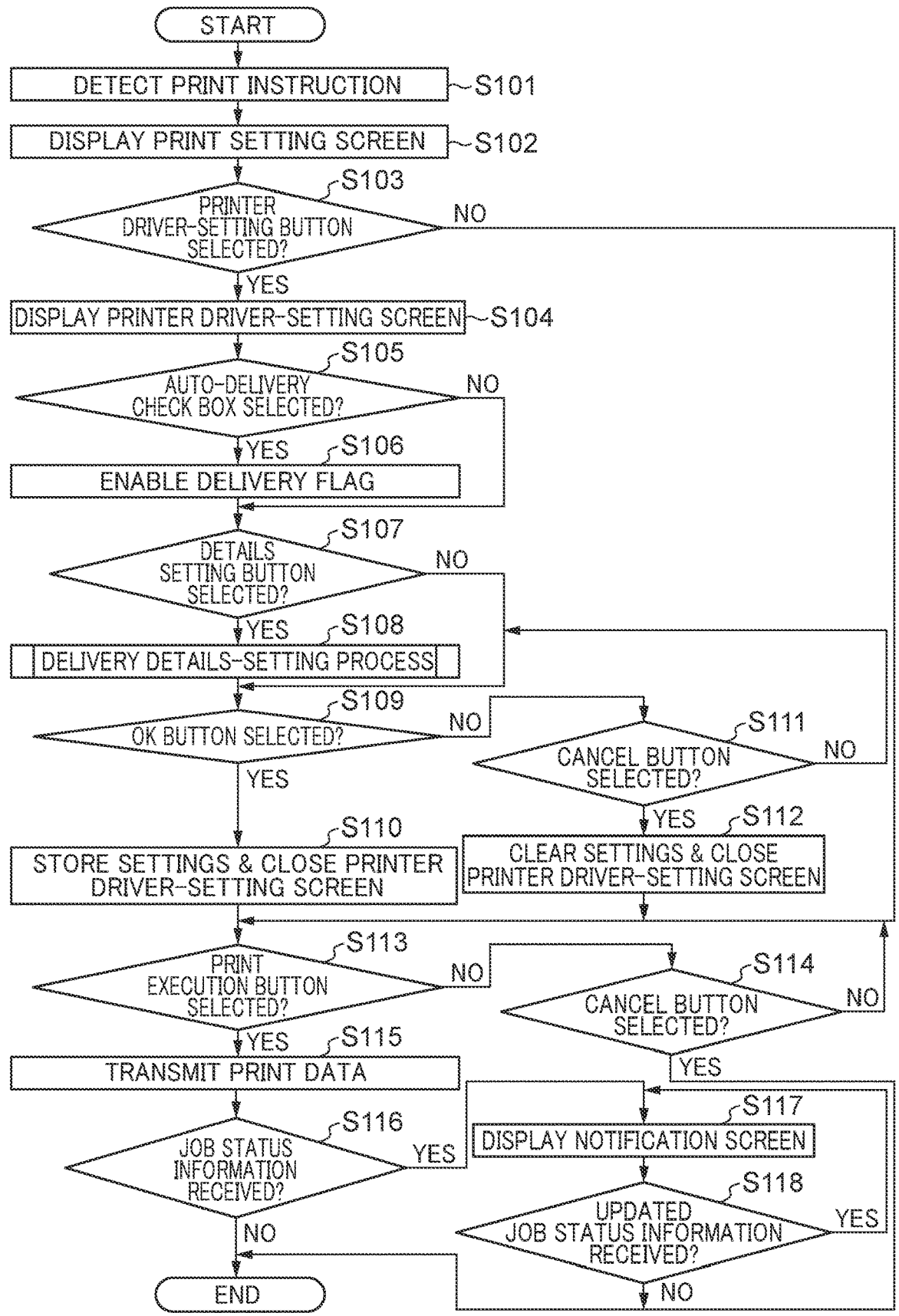
FIG. 6 is a flowchart of a print-and-delivery job-requesting process performed by a PC appearing in FIG. 1.

FIG. 6 is a flowchart of a print-and-delivery job-requesting process performed by the PC 200 appearing in FIG. 1. The print-and-delivery job-requesting process is realized by a CPU (not shown) of the PC 200, which loads a program stored e.g. in a ROM (not shown) into a RAM (not shown) and executes the loaded program. The print-and-delivery job-requesting process shown in FIG. 6 will be described assuming that a user AAA appearing in FIG. 7A requests a print-and-delivery job using the PC 200, by way of example.

Referring to FIG. 6, when the PC 200 detects that the user AAA has opened data to be printed and has given an instruction for printing this data (step S101), the PC 200 displays a print setting screen on a display section (not shown) of the PC 200 (step S102). The print setting screen includes e.g. a setting item for selecting a printer caused to execute print processing, a setting item of a printing range, a setting item of the number of copies, a setting item of making simplified print settings, a printer driver-setting button, a print execution button, a cancel button, and so forth. Here, it is assumed that the image forming apparatus 100 has been selected as the printer caused to execute print processing.

Then, the PC 200 determines whether or not the printer driver-setting button on the print setting screen has been selected by the user AAA (step S103). In the step S103, if it is determined that the printer driver-setting button has not been selected, the process proceeds to a step S113, whereas if it is determined that the printer driver-setting button has been selected, the PC 200 displays a printer driver-setting screen 220 shown in FIG. 7A on the display section of the PC 200 (step S104). The printer driver-setting screen 220 includes respective setting items of a document size, an output sheet size, a printing direction, a page layout, single-sided/double-sided printing, a binding direction, a color mode, and so forth. Further, the printer driver-setting screen 220 includes an auto-delivery check box 221, a details setting button 222, an OK button 223, and a cancel button 224.

Then, the PC 200 determines whether or not the auto-delivery check box 221 has been selected by the user AAA on the printer driver-setting screen 220 (step S105). If it is determined in the step S105 that the auto-delivery check box 221 has not been selected by the user AAA, the process proceeds to a step S107. If it is determined in the step S105 that the auto-delivery check box 221 has been selected by the user AAA, the PC 200 enables a delivery flag for instructing the print delivery apparatus 300 to deliver a print (step S106).

Then, the PC 200 determines whether or not the details setting button 222 has been selected by the user AAA on the printer driver-setting screen 220 (step S107). If it is determined in the step S107 that the details setting button 222 has not been selected by the user AAA, the process proceeds to a step S109. If it is determined in the step S107 that the details setting button 222 has been selected by the user AAA, the PC 200 performs a delivery details-setting process (step S108). In the delivery details-setting process, setting information on a delivery designated by the user is set. Then, the PC 200 determines whether or not the OK button 223 has been selected by the user AAA on the printer driver-setting screen 220 (step S109).

If it is determined in the step S109 that the OK button 223 has been selected by the user AAA, the process proceeds to a step S110. In the step S110, the PC 200 stores the settings made on the printer driver-setting screen 220 e.g. in the RAM of the PC 200 and closes the printer driver-setting screen 220. Then, the process proceeds to a step S113, described hereinafter.

If it is determined in the step S109 that the OK button 223 has not been selected by the user AAA, the PC 200 determines whether or not the cancel button 224 has been selected by the user AAA on the printer driver-setting screen 220 (step S111). If it is determined in the step S111 that the cancel button 224 has not been selected by the user AAA, the process returns to the step S109. If it is determined in the step S111 that the cancel button 224 has been selected by the user AAA, the PC 200 clears all of the settings made on the printer driver-setting screen 220 and closes the printer driver-setting screen 220 (step S112). When the printer driver-setting screen 220 is closed in the step S110 or S112, the above-described print setting screen is displayed on the display section of the PC 200.

Then, the PC 200 determines whether or not the print execution button on the print setting screen has been selected by the user AAA (step S113). If it is determined in the step S113 that the print execution button has not been selected by the user AAA, the PC 200 determines whether or not the cancel button on the print setting screen has been selected by the user AAA (step S114). If it is determined in the step S114 that the cancel button has not been selected by the user AAA, the process returns to the step S113. If it is determined in the step S114 that the cancel button has been selected by the user AAA, the PC 200 terminates the present process without transmitting the print data for causing the print-and-delivery job to be executed, to the image forming apparatus 100. This print data is print data generated based on the settings made on the print setting screen and the printer driver-setting screen 220.

If it is determined in the step S113 that the print execution button has been selected by the user AAA, the PC 200 transmits the print data to the image forming apparatus 100 (step S115). In a case where the received print data is the print data for causing the print-and-delivery job to be executed, the image forming apparatus 100 transmits job status information 230 shown in FIG. 7B, including scheduled delivery time information and the like formed based on a status of a job queue of the image forming apparatus 100, to the PC 200.

The PC 200 determines whether or not the job status information 230 has been received from the image forming apparatus 100 (step S116). If it is determined in the step S116 that the job status information 230 has not been received from the image forming apparatus 100, the present process is terminated. If it is determined in the step S116 that the job status information 230 has been received from the image forming apparatus 100, the process proceeds to a step S117. In the step S117, the PC 200 displays a notification screen including the received job status information 230 on the display section of the PC 200. Then, the PC 200 determines whether or not the updated job status information has been received from the image forming apparatus 100 (step S118). The determination in the step S118 is performed at predetermined time intervals. If it is determined in the step S118 that the updated job status information has been received from the image forming apparatus 100, the process returns to the step S117. The PC 200 displays a notification screen including the updated job status information on the display section of the PC 200. If it is determined in the step S118 that the updated job status information has not been received from the image forming apparatus 100 a predetermined number of times, the present process is terminated.

Thus, the print-and-delivery job is requested from the PC 200 to the image forming apparatus 100. The image forming apparatus 100 produces a print by performing print processing based on the received print data and passes this print to the print delivery apparatus 300. The print delivery apparatus 300 delivers the print acquired from the image forming apparatus 100 to a desk of the user AAA as the request source of the print-and-delivery job.

Incidentally, in the present embodiment, for example, a plurality of print-and-delivery jobs requested within a predetermined time period are collectively processed to thereby improve the delivery efficiency of prints. For example, the image forming apparatus 100 produces all prints of a plurality of print-and-delivery jobs requested within a predetermined time period and passes all of the produced prints to the print delivery apparatus 300. The print delivery apparatus 300 stores the prints in the collection sections 306 different on a request source-by-request source basis and delivers the prints to the request sources.

However, if a plurality of print-and-delivery jobs requested within a predetermined time period are collectively processed, the image forming apparatus 100 cannot execute another job which cannot be processed in parallel with each print-and-delivery job until production and delivery of all prints of the plurality of print-and-delivery jobs are completed. This causes a problem that a user having instructed execution of the other job which cannot be processed in parallel with each print-and-delivery job from the operation panel 102 of the image forming apparatus 100 is compelled to wait for longer than necessary.

In contrast, according to the present embodiment, in a state in which print-and-delivery jobs have been registered in the job queue of the image forming apparatus 100, in a case where an instruction for executing a predetermined job which cannot be processed in parallel with each print-and-delivery job is received from the operation panel 102, predetermined job priority control is performed. The predetermined job priority control is control for causing a predetermined job to be preferentially executed.

Figure 8:
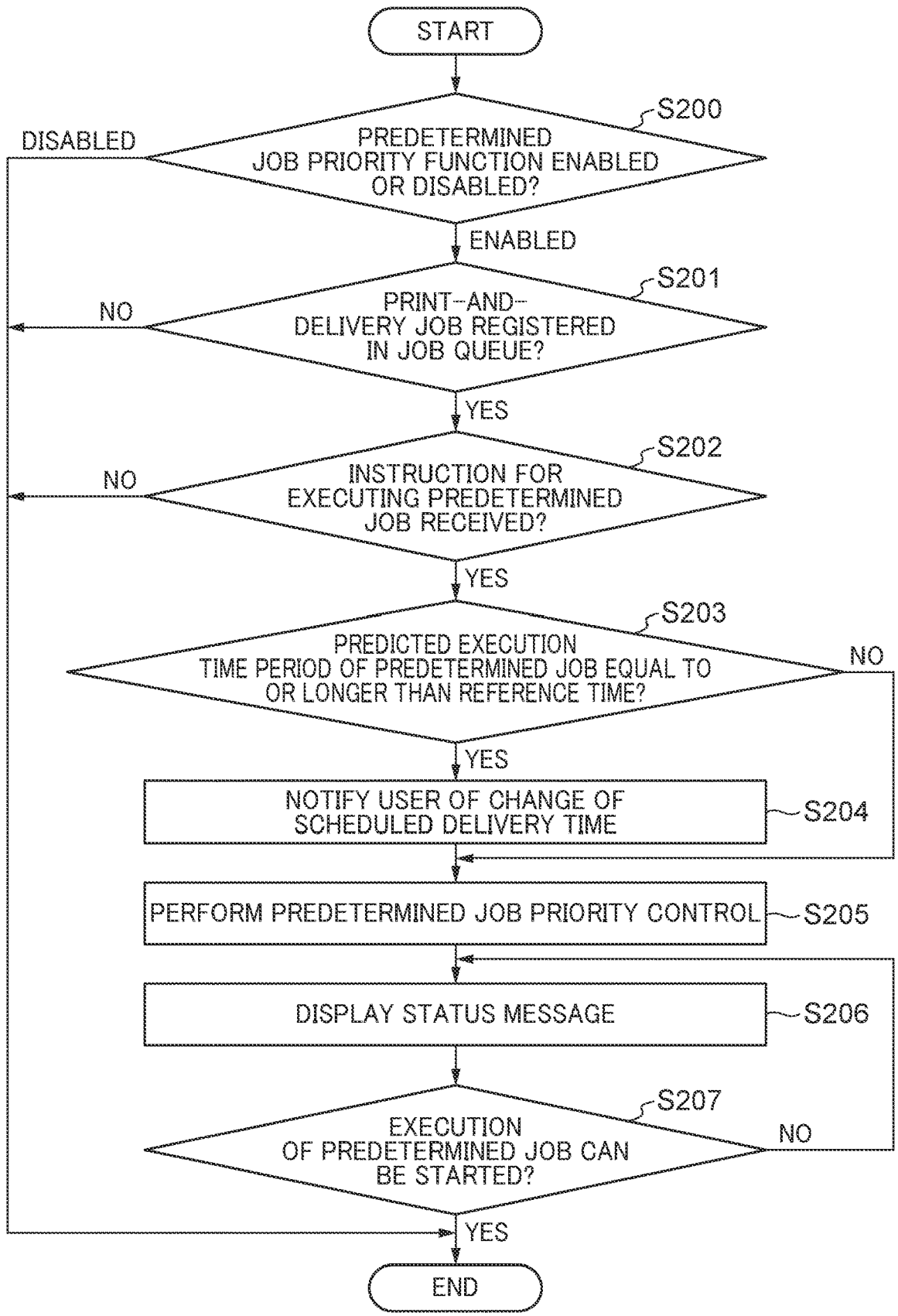
FIG. 8 is a flowchart of a job control process performed by the image forming apparatus appearing in FIG. 1.

FIG. 8 is a flowchart of a job control process performed by the image forming apparatus 100 appearing in FIG. 1. The job control process in FIG. 8 is realized by the CPU 101a that loads an associated one of the programs 109a stored in the storage device 109 into the memory 101b and executes the loaded one of the programs 109a. Here, the image forming apparatus 100 in the present embodiment has a predetermined job priority function for causing preferential execution of a predetermined job of which execution is instructed by a user through operation of the operation panel 102. The predetermined job is a job which cannot be processed in parallel with any print-and-delivery job. In a case where the image forming apparatus 100 is configured to be capable of coping with multitask processing, the predetermined job is a job for producing a print, such as a reservation print job, a storage print job, or a copy job. That is, the predetermined job does not include jobs for generating no print, such as a scan and transmission job for transmitting scanned image data to an external apparatus and a FAX transmission job. The reservation print job refers to a job for the image forming apparatus 100 not to immediately execute print processing of print data when the print data is received from an external apparatus, but to execute the print processing upon receipt of an execution instruction therefor from a user on the operation panel 102. The storage print job is a job for the image forming apparatus 100 to execute print processing of one of a plurality of print data items stored in a server on a network, the memory 101b, the user folder 109b, or the like, which is designated for printing by a user from the operation panel 102. Note that in the job control process in FIG. 8, it is assumed that the predetermined job priority function has already been set to be either enabled or disabled. The setting of the predetermined job priority function is performed by an administrator of the image forming apparatus 100.

Referring to FIG. 8, first, the CPU 101a determines to which of enabled and disabled the predetermined job priority function is set (step S200). If it is determined in the step S200 that the predetermined job priority function is set to disabled, the present process is terminated. If it is determined in the step S200 that the predetermined job priority function is set to enabled, the process proceeds to a step S201.

In the step S201, the CPU 101a determines whether or not a print-and-delivery job has been registered in the job queue. In the image forming apparatus 100, jobs are sequentially registered in the job queue in the order of reception, and the jobs are executed according to the registration order. For example, in a case where a print-and-delivery job in a print executing state and/or one or more print-and-delivery jobs in a print waiting state has/have been registered in the job queue, it is determined that a print-and-delivery job has been registered in the job queue. On the other hand, in a case where neither a print-and-delivery job in the print executing state nor a print-and-delivery job in the print waiting state has been registered in the job queue, it is determined that no print-and-delivery job has been registered in the job queue.

If it is determined in the step S201 that no print-and-delivery job has been registered in the job queue, the present process is terminated. If it is determined in the step S201 that a print-and-delivery job has been registered in the job queue, the process proceeds to a step S202.

In the step S202, the CPU 101a determines whether or not an instruction for executing a predetermined job has been received from the user on the operation panel 102. If it is determined in the step S202 that an instruction for executing the predetermined job has not been received from the user on the operation panel 102, the CPU 101a executes the print-and-delivery job registered in the job queue. When production and delivery of a print in this print-and-delivery job is completed, the present process is terminated.

If it is determined in the step S202 that an instruction for executing the predetermined job has been received from the user on the operation panel 102, the process proceeds to a step S203. In the step S203, the CPU 101a determines whether or not a predicted execution time period of the predetermined job is equal to or longer than a reference time period set in advance. The predicted execution time period of the predetermined job is calculated e.g. based on a specification of page per minute (ppm) of the image forming apparatus 100 and a volume of the received print data. Note that in the present embodiment, it is assumed that the reference time period is set to five minutes by way of example. If the predicted execution time period of the predetermined job is shorter than the reference time period, e.g. five minutes, the process proceeds to a step S205, described hereinafter. If the predicted execution time period of the predetermined job is equal to or longer than the reference time period, i.e. equal to or longer than five minutes, the process proceeds to a step S204.

In the step S204, the CPU 101a notifies a change of the scheduled delivery time to a user who is to be affected by executing the predetermined job priority control. More specifically, the CPU 101a transmits the job status information in which the scheduled delivery time has been updated, to the apparatus of the request source of a print-and-delivery job which has been requested before the predetermined job and of which a print has not been delivered yet. On the display section of the apparatus having received this job status information, such as the PC 200, a notification screen is displayed which notifies that the scheduled delivery time has been updated.

Then, in the step S205, the CPU 101a performs the predetermined job priority control. In the predetermined job priority control, the CPU 101a changes the position of the predetermined job in the order of execution of jobs in the job queue to a position of the top of the print-and-delivery jobs in the print waiting state. With this, the predetermined job is executed preferentially to the print-and-delivery jobs in the print waiting state. Note that for example, in a case where a print-and-delivery job registered in the job queue is in the print executing state, the position of the predetermined job in the order of execution of jobs in the job queue is set next to the print-and-delivery job in the print executing state. That is, the image forming apparatus 100 continues the print processing being executed without interruption, and after completion of this print processing, the image forming apparatus 100 executes the predetermined job. With this, it is possible to reduce the waiting time of the user having instructed execution of the predetermined job from the operation panel 102 without interrupting the print processing being executed and generating an incomplete print.

Then, in a step S206, the CPU 101a displays a status message on the display section 102a. For example, in a case where a print-and-delivery job registered in the job queue is in the print executing state in the step S205, a message that printing of the print-and-delivery job is being executed is displayed on the display section 102a as the status message. Then, in a step S207, the CPU 101a determines whether or not execution of the predetermined job can be started. In the step S207, for example, in a case where the print processing of the print-and-delivery job positioned before the predetermined job in the job queue is completed and the image forming apparatus 100 is ready to execute the predetermined job, it is determined that execution of the predetermined job can be started. On the other hand, in a case where the image forming apparatus 100 is not ready to execute the predetermined job, it is determined that execution of the predetermined job cannot be started. If it is determined in the step S207 that execution of the predetermined job cannot be started, the process returns to the step S206. Thus, in the present embodiment, the status message is displayed on the display section 102a until the image forming apparatus 100 is ready to execute the predetermined job. Note that in the present embodiment, count-down may be displayed until the image forming apparatus 100 becomes ready to execute the predetermined job.

If it is determined in the step S207 that execution of the predetermined job can be started, the present process is terminated. After that, the predetermined job is executed.

Figure 10A:
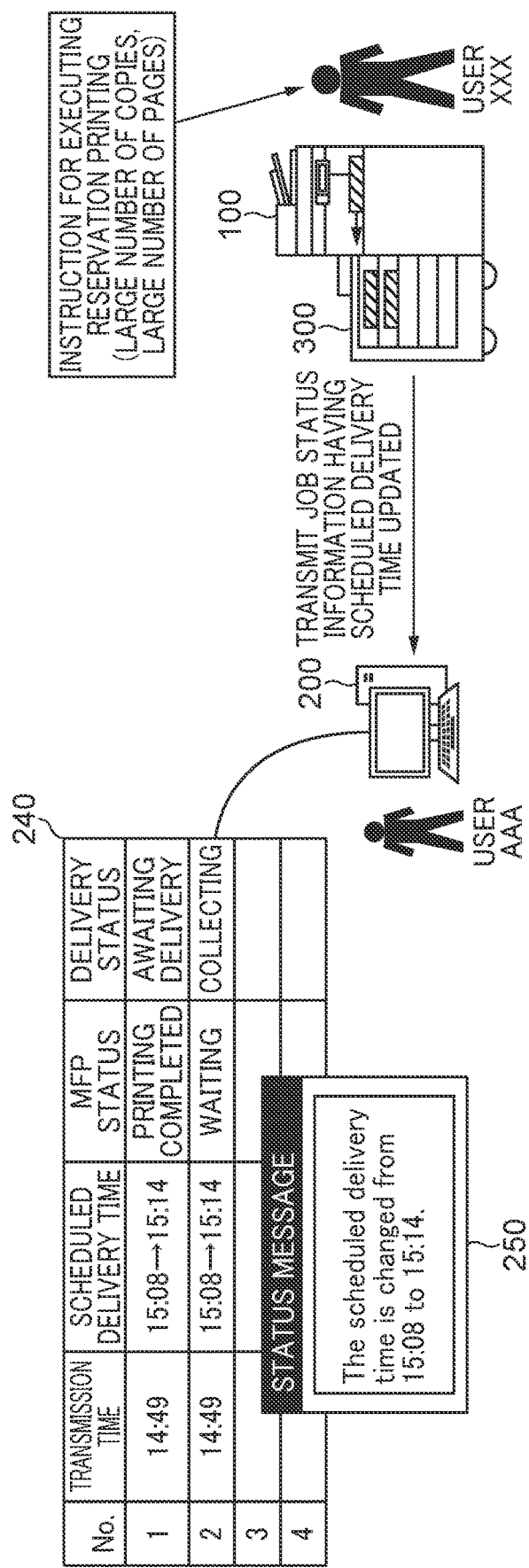

Next, a description will be given of an operation performed by the image forming apparatus 100 having print-and-delivery jobs registered in the job queue, when an instruction for executing a predetermined job is received from the operation panel 102. Here, as shown in a table 130 in FIG. 9A2, it is assumed that the image forming apparatus 100 is executing print processing of a print-and-delivery job (denoted as "delivery print" in the illustrated example) of No. 2, and print processing of a print-and-delivery job of No. 3 is in the print waiting state. In this state, when a user XXX inputs an instruction for executing a reservation print job by operating the operation panel 102, a status message 140 is displayed on the display section 102a of the image forming apparatus 100, as shown in FIG. 9A1. Then, in the image forming apparatus 100, as shown in a table 131 in FIG. 9B2, the position of the above-mentioned reservation print job in the order of execution of jobs in the job queue is changed to the top of the print-and-delivery jobs in the print waiting state. Here, for example, in a case where the predicted execution time period of the above-mentioned reservation print job is equal to or longer than the reference time period set in advance, a change of the scheduled delivery time is notified to a user, e.g. the user AAA, who is to be affected by preferential execution of the above-mentioned reservation print job. More specifically, as shown in FIG. 10A, the image forming apparatus 100 transmits job status information 240 in which the scheduled delivery time has been updated, to the PC 200 of the user AAA. The PC 200 displays a notification screen 250 on the display section of the PC 200 based on the received job status information 240. FIG. 10B is a table 140, corresponding to FIG. 9B2, of an updated job queue.

After that, when the image forming apparatus 100 is ready to execute the reservation print job, the image forming apparatus 100 starts the reservation print job. After the reservation print job is completed as shown in a table 132 in FIG. 9C2, the image forming apparatus 100 starts print processing of the next print-and-delivery job positioned after the reservation print job in the table 132 (print-and-delivery job of No. 3 in a table 133 in FIG. 9D2). After that, when the image forming apparatus 100 completes the print processing of this print-and-deliver job and passes the produced print to the print delivery apparatus 300, as shown in FIG. 9E1 and FIG. 9E2 illustrating a table 134 of an updated job queue, the print delivery apparatus 300 starts delivery of prints according to delivery instructions received from the image forming apparatus 100.

According to the above-described embodiment, in a state in which at least one print-and-delivery job has been registered in the job queue, in a case where an instruction for executing a predetermined job which cannot be processed in parallel with any print-and-delivery job is received from the operation panel 102, the predetermined job priority control is performed. With this, it is possible to preferentially execute the predetermined job, and therefore, it is possible to reduce the waiting time of the user who has input the instruction for executing the predetermined job from the operation panel 102 of the image forming apparatus 100.

Further, in the above-described embodiment, the predetermined job is a job for producing a print. This makes it possible to provide the print to a user who has instructed execution of the predetermined job from the operation panel 102 of the image forming apparatus 100, without compelling the user to wait longer than necessary.

Further, in the above-described embodiment, a job for producing a print is a reservation print job, a storage print job, or a copy job. With this, the image forming apparatus capable of processing a print-and-delivery job can process a reservation print job, a storage print job, and a copy job received from the operation panel 102 of the image forming apparatus 100 without delay.

In the above-described embodiment, the predetermined job priority function can be set to enabled or disabled. This makes it possible to control execution of the predetermined job priority function in accordance with a use environment of the image forming apparatus 100. As a result, in an environment in which a plurality of print-and-delivery jobs requested within a predetermined time period are collectively processed, it is possible to reduce the waiting time of a user having input an instruction for executing the predetermined job from the operation panel 102 of the image forming apparatus 100. Further, in an environment in which a plurality of print-and-delivery jobs requested within a predetermined time period are not collectively processed, it is possible to suppress undesired execution of the predetermined job priority control and prevent delay of print-and-delivery jobs.

In the above-described embodiment, in a case where a predicted execution time period of a predetermined job is equal to or longer than the reference time period, a change of a scheduled delivery time of a print of a print-and-delivery job is notified to a request source of the print-and-delivery job. With this, it is possible to notify the request source of the print-and-delivery job that the delivery time will be delayed while reducing the waiting time of the user having instructed execution of the job from the operation panel 102 of the image forming apparatus 100.

Note that although in the present embodiment, it is assumed that the print delivery apparatus 300 starts after storing prints of a plurality of print-and-delivery jobs, e.g. prints of print-and-delivery jobs received within a unit time period of two minutes are collectively delivered by one delivery operation, this is not limitative. For example, the print delivery apparatus 300 may start after storing a print of one print-and-delivery job.

Further, in the present embodiment, in a case where the image forming apparatus 100 is not capable of multitask processing, the predetermined job may include not only a job for producing a print, but also a job for generating no print, such as a scan and transmission job and a Fax transmission job.

Further, in the present embodiment, the order of execution of jobs may be controlled based on time setting information set when each print-and-delivery job is requested. The time setting information includes setting information concerning delivery times. The time setting information is set e.g. in the delivery details-setting process in the step S108 executed when the user selects the details setting button 222 on the printer driver-setting screen 220.

Figure 11:
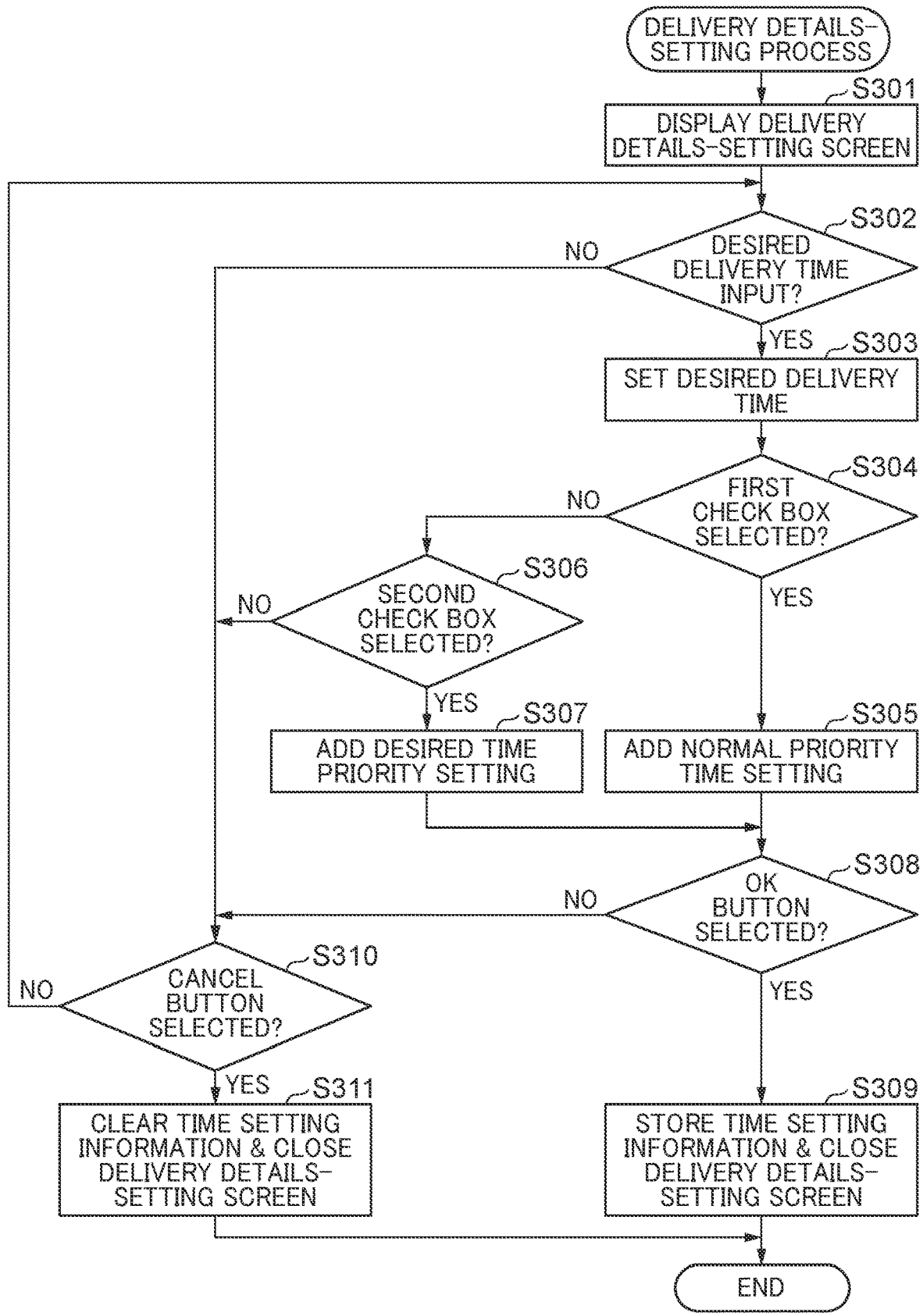
FIG. 11 is a flowchart of a delivery details-setting process in a step in FIG. 6.

FIG. 11 is a flowchart of the delivery details-setting process in the step S108 in FIG. 6.

Figure 12:
FIG. 12 is a diagram showing an example of a delivery details-setting screen displayed on a display section of the PC appearing in FIG. 1.

Referring to FIG. 11, the PC 200 displays a delivery details-setting screen 260 shown in FIG. 12 on the display section of the PC 200 (step S301). The delivery details-setting screen 260 includes a setting item 261 to which a user is prompted to input a desired delivery time. Further, the delivery details-setting screen 260 includes, besides a check box 266 associated with the setting item 261, a first check box 262 and a second check box 263 one of which is selectable by a user. Further, the delivery details-setting screen 260 includes a cancel button 264 and an OK button 265.

The PC 200 determines whether or not the user has input a desired delivery time in the setting item 261 on the delivery details-setting screen 260 (step S302). If it is determined in the step S302 that the user has not input a desired delivery time in the setting item 261 on the delivery details-setting screen 260, the process proceeds to a step S310, described hereinafter. If it is determined in the step S302 that the user has input a desired delivery time in the setting item 261 on the delivery details-setting screen 260, the PC 200 sets the input desired delivery time as time setting information (step S303). Then, the PC 200 determines whether or not the user has selected the first check box 262 (step S304).

If it is determined in the step S304 that the user has selected the first check box 262, the PC 200 adds a normal priority time setting to the time setting information (step S305). The normal priority time setting is a flexible priority setting which makes it possible to make a delivery at any time insofar as it is before the desired delivery time. Then, the process proceeds to a step S308, described hereinafter.

If it is determined in the step S304 that the user has not selected the first check box 262, the PC 200 determines whether or not the user has selected the second check box 263 (step S306). If it is determined in the step S306 that the user has not selected the second check box 263, the process proceeds to the step S310, described hereinafter. If it is determined in the step S306 that the user has selected the second check box 263, the PC 200 adds a desired time priority setting to the time setting information (step S307). The desired time priority setting is a priority setting for controlling the delivery to be performed at the desired delivery time even when the delivery is ready before the desired delivery time. Then, the PC 200 determines whether or not the user has selected the OK button 265 (step S308).

If it is determined in the step S308 that the user has selected the OK button 265, the PC 200 stores the time setting information e.g. in the RAM of the PC 200 and closes the delivery details-setting screen 260 (step S309). The stored time setting information is included in the print data transmitted to the image forming apparatus 100 in the above-described step S115. After that, the delivery details-setting process is terminated, and the process proceeds to the above-described step S109.

If it is determined in the step S308 that the user has not selected the OK button 265, the PC 200 determines whether or not the user has selected the cancel button 264 (step S310). If it is determined in the step S310 that the user has not selected the cancel button 264, the process returns to the step S302. If it is determined in the step S310 that the user has selected the cancel button 264, the PC 200 clears all of the time setting information and closes the delivery details-setting screen 260 (step S311). After that, the delivery details-setting process is terminated, and the process proceeds to the above-described step S109.

Figure 13:
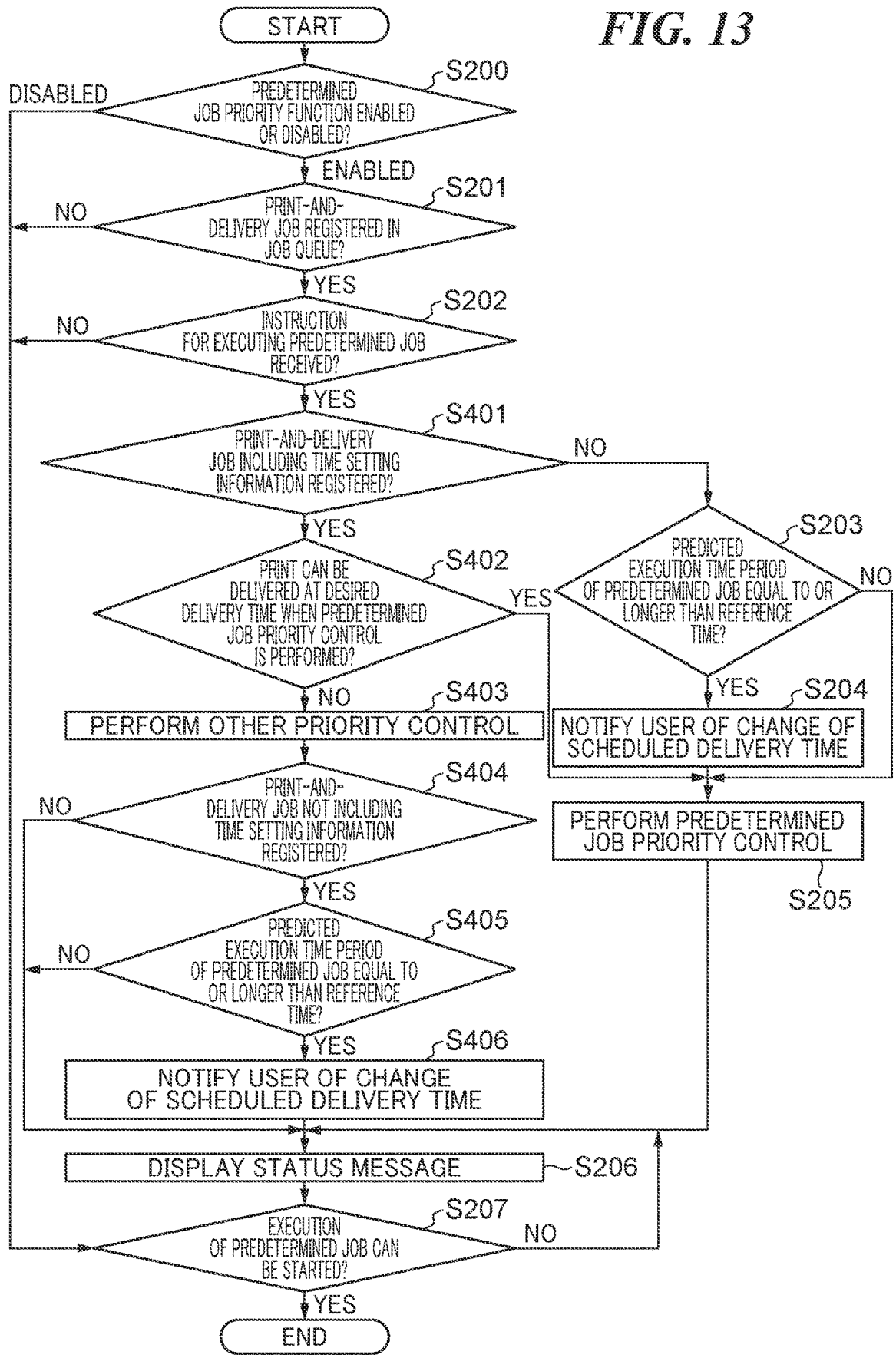
FIG. 13 is a flowchart of a variation of the job control process performed by the image forming apparatus appearing in FIG. 1.

FIG. 13 is a flowchart of a variation of the job control process performed by the image forming apparatus 100 appearing in FIG. 1. Note that the job control process in FIG. 13 is similar to the above-described job control process in FIG. 8, and the following description will be given mainly of different points from the job control process in FIG. 8. Note that the same steps as those in FIG. 8 are denoted by the same step numbers, and description thereof is omitted. Similar to the job control process in FIG. 8, the job control process in FIG. 13 is realized by the CPU 101a that loads an associated one of the programs 109a stored in the storage device 109 into the memory 101b and executes the loaded one of the programs 109a. Note that, similar to the job control process FIG. 8, in the job control process in FIG. 13, it is assumed that the predetermined job priority function has been set to either enabled or disabled by the administrator of the image forming apparatus 100.

Referring to FIG. 13, first, the steps S200 to S202 are executed. Then, the CPU 101a determines whether or not a print-and-delivery job having print data including time setting information has been registered in the job queue (step S401). The time setting information includes a desired delivery time, and the normal priority time setting or the desired time priority setting, as described above. If it is determined in the step S401 that no print-and-delivery job having print data including time setting information has been registered in the job queue, the process proceeds to the step S203, and then the steps S204 to S207 are executed, followed by terminating the present process.

If it is determined in the step S401 that a print-and-delivery job having print data including time setting information has been registered in the job queue, the process proceeds to a step S402. In the step S402, the CPU 101a determines whether or not it is possible to deliver prints at respective desired delivery times when the predetermined job priority control is performed. The CPU 101a calculates a predicted execution time period of the predetermined job, an execution instruction of which has been received from the operation panel 102, and performs the determination in the step S402 based on the calculated predicted execution time period.

Here, a case will be described, by way of example, in which two print-and-delivery jobs each having print data including time setting information are in the print waiting state, as indicated in a table 150 in FIG. 14A2. The print-and-delivery job of No. 2 is a job in which "15:15" is set as a desired delivery time, and further, the normal priority time setting is set. The print-and-delivery job of No. 3 is a job in which "15:05" is set as a desired delivery time, and further, the desired time priority setting is set. Let it be assumed, for example, as indicated in FIG. 14A1, that the user XXX has input an instruction for executing a reservation print job from the operation panel 102 at "14:59". In a case where the predicted execution time period of this reservation print job is e.g. seven minutes, if this reservation print job is preferentially executed, it is impossible to deliver a print of the print-and-delivery job of No. 3 at the desired delivery time. In this case, the CPU 101a determines that it is impossible to deliver prints at respective desired delivery times when the predetermined job priority control is performed. On the other hand, in a case where the predicted execution time period of the above-mentioned reservation print job is e.g. one minute, even when this reservation print job is preferentially executed, it is possible to deliver both of prints of the print-and-delivery jobs of No. 2 and 3 at the respective desired delivery times. In this case, the CPU 101a determines that it is possible to deliver prints at respective desired delivery times when the predetermined job priority control is performed.

If it is determined in the step S402 that it is possible to deliver prints at respective desired delivery times when the predetermined job priority control is performed, the process proceeds to the step S205, and the predetermined job priority control is performed. If it is determined in the step S402 that it is impossible to deliver prints at respective desired delivery times when the predetermined job priority control is performed, the process proceeds to a step S403.

In the step S403, the CPU 101a performs other priority control. In the other priority control, the CPU 101a performs control such that the predetermined job is executed as soon as possible while making it possible to deliver prints of all print-and-delivery jobs each having print data including the time setting information at respective desired delivery times. Here, it is assumed that in response to the instruction input at "14:59" as indicated in FIG. 14A1 by the user XXX, for executing the reservation print job from the operation panel 102, the predicted execution time period of this reservation print job is calculated as seven minutes, at "15:00", as shown in FIG. 14B1, and the print processing of a print-and-delivery job of No. 1 has been completed as indicated in FIG. 14B2. FIG. 14B2 shows a table 151 of the job queue which corresponds to the job queue shown in FIG. 14A2 and is in a state one minute after the same. In this case, in the other priority control, as indicated in a table 152 shown in FIG. 14C2, the CPU 101a sets the position of this reservation print job in the order of execution of jobs to a position after the print-and-delivery job of No. 3 having little lead time before the desired delivery time. Further, the CPU 101a changes the position of the print-and-delivery job of No. 2 in the order of execution of jobs, which has sufficient lead time before the desired delivery time, to a position after the reservation print job. By thus performing the control, it is possible to reduce the waiting time of the user who has given an instruction for executing the predetermined job from the operation panel 102 of the image forming apparatus 100 while making it possible to deliver prints of all print-and-delivery jobs each having print data including the time setting information at respective desired delivery times.

Then, the CPU 101a determines whether or not a print-and-delivery job having print data not including time setting information has been registered in the job queue (step 404). If it is determined in the step S404 that no print-and-delivery job having print data not including time setting information has been registered in the job queue, the process proceeds to the step S206. If it is determined in the step S404 that a print-and-delivery job having print data not including time setting information has been registered in the job queue, the process proceeds to a step S405. In the step S405, similar to the step S203, the CPU 101a determines whether or not the predicted execution time period of the predetermined job is equal to or longer than the reference time period.

If it is determined in the step S405 that the predicted execution time period of the predetermined job is shorter than the reference time period, the process proceeds to the step S206. If it is determined in the step S405 that the predicted execution time period of the predetermined job is equal to or longer than the reference time period, the process proceeds to a step S406. In the step S406, similar to the step S204, the CPU 101a notifies a change of the scheduled delivery time to a user who is to be affected by executing the predetermined job priority control. After that, the process proceeds to the step S206.

In the above-described embodiment, the order of execution of jobs is controlled based on the time setting information set when each print-and-delivery job is requested. With this, it is possible to reduce the waiting time of the user who has given an instruction for executing a predetermined job from the operation panel 102 of the image forming apparatus 100 while making it possible to deliver prints of all print-and-delivery jobs each having print data including the time setting information at respective desired delivery times.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091471 filed Jun. 6, 2022, which is hereby incorporated by reference herein in its entirety.

What is claimed is:

1. An image forming apparatus for performing, according to receipt of a request of a print-and-delivery job from an external apparatus, print processing to produce a print and passing the produced print to a print delivery apparatus that delivers the print to a designated delivery destination, the image forming apparatus comprising:
an operation panel configured to receive an instruction from a user;
memory storing instructions; and
at least one processor that implements the instructions to:
control an order of execution of jobs, including performing predetermined job priority control that causes a predetermined job that includes performing the print processing to be preferentially executed over the print-and-delivery job, in a state where:
the print-and-delivery job has been registered in a job queue of the image forming apparatus; and
an instruction for executing the predetermined job is received from the user via the operation panel;
calculate a predicted execution time period of the predetermined job; and
notify a change of a scheduled delivery time of the produced print to a request source of the print-and-delivery job, in a state where the predicted execution time period of the predetermined job is equal to or longer than a reference time period set in advance.

2. The image forming apparatus according to claim 1, wherein the predetermined job is for producing the print.

3. The image forming apparatus according to claim 2, wherein the predetermined job is a reservation print job, a storage print job, or a copy job.

4. The image forming apparatus according to claim 1, wherein the at least one processor enables or disables a function for causing the predetermined job to be preferentially executed.

5. The image forming apparatus according to claim 1, wherein the at least one processor determines a position of the predetermined job in the order of execution of jobs, based on setting information concerning a delivery time set as the print-and-delivery job is received.

6. A method of controlling an image forming apparatus that includes an operation panel configured to receive an instruction from a user, and according to receipt of a request of a print-and-delivery job from an external apparatus, for performing print processing to produce a print and passing the produced print to a print delivery apparatus that delivers the print to a designated delivery destination, the method comprising:
receiving an instruction from a user via the operation panel;
controlling an order of execution of jobs, including performing predetermined job priority control that causes a predetermined job that includes performing the print processing to be preferentially executed over the print-and-delivery job, in a state where:
the print-and-delivery job has been registered in a job queue of the image forming apparatus; and
an instruction for executing the predetermined job is received from the user via the operation panel;
calculating a predicted execution time period of the predetermined job; and
notifying a change of a scheduled delivery time of the produced print to a request source of the print-and-delivery job, in a state where the predicted execution time period of the predetermined job is equal to or longer than a reference time period set in advance.

7. A non-transitory computer-readable storage medium storing a program executable by a computer to execute a method of controlling an image forming apparatus that includes an operation panel configured to receive an instruction from a user, and according to receipt of a request of a print-and-delivery job from an external apparatus, for performing print processing to produce a print and passing the produced print to a print delivery apparatus that delivers the print to a designated delivery destination, the method comprising:
receiving an instruction from a user via the operation panel;
controlling an order of execution of jobs, including performing predetermined job priority control that causes a predetermined job that includes performing the print processing to be preferentially executed over the print-and-delivery job, in a state where:
- the print-and-delivery job has been registered in a job queue of the image forming apparatus;
- an instruction for executing the predetermined job is received from the user via the operation panel;

calculating a predicted execution time period of the predetermined job; and notifying a change of a scheduled delivery time of the produced print to a request source of the print-and-delivery job, in a state where the predicted execution time period of the predetermined job is equal to or longer than a reference time period set in advance.

8. The image forming apparatus according to claim 1, wherein the predetermined job is for producing the print to be provided by the image forming apparatus to the user who gave the instruction for executing the predetermined job through the operation panel.

* * * * *